US012771267B2

(12) United States Patent
Imai et al.

(10) Patent No.: US 12,771,267 B2
(45) Date of Patent: Oct. 20, 2026

(54) MOTOR CONTROL CIRCUIT, MOTOR CONTROL INTEGRATED CIRCUIT, AND METHOD FOR CONTROLLABLY DRIVING MOTOR

(71) Applicants: Toshiyuki Imai, Nagano (JP); Takashi Sugano, Tokyo (JP); Tsuyoshi Akiyama, Tokyo (JP)

(72) Inventors: Toshiyuki Imai, Nagano (JP); Takashi Sugano, Tokyo (JP); Tsuyoshi Akiyama, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 202 days.

(21) Appl. No.: 18/750,093

(22) Filed: Jun. 21, 2024

(65) Prior Publication Data

US 2025/0015736 A1 Jan. 9, 2025

(30) Foreign Application Priority Data

Jul. 7, 2023 (JP) ................................. 2023-112642
Aug. 25, 2023 (JP) ................................. 2023-137380

(51) Int. Cl.
*H02P 6/15* (2016.01)
*H02P 6/08* (2016.01)
*H02P 6/16* (2016.01)

(52) U.S. Cl.
CPC .............. *H02P 6/153* (2016.02); *H02P 6/085* (2013.01); *H02P 6/16* (2013.01)

(58) Field of Classification Search
CPC .. H02P 6/153; H02P 6/085; H02P 6/16; H02P 1/02; H02P 6/28; H02P 6/15; H02P 6/14; H02P 6/26; H02P 7/06; H02P 2207/05
See application file for complete search history.

(56) References Cited

U.S. PATENT DOCUMENTS 5,710,509 A * 1/1998 Goto .................... G01D 5/2073 318/656
2004/0135529 A1 7/2004 Yoshitomi et al.
2016/0118916 A1* 4/2016 Gohara ..................... H02P 6/34 318/400.38
2022/0345056 A1 10/2022 Aoki et al.

FOREIGN PATENT DOCUMENTS

JP 2004-153921 5/2004

OTHER PUBLICATIONS

Extended European search report issued on Nov. 28, 2024 with respect to the corresponding European patent application No. 24185609.5.

* cited by examiner

*Primary Examiner* — Bickey Dhakal
(74) *Attorney, Agent, or Firm* — IPUSA, PLLC

(57) ABSTRACT

A motor control circuit includes a phase adjuster configured to adjust a phase of a targeted position detecting signal that is present after a subsequent cycle of a reference position detecting signal based on (i) a timing at which a drive current detected by a current-zero point detector becomes zero and (ii) the reference position detecting signal; and a drive controller configured to control a timing at which a drive voltage varies such that the timing of the drive voltage varying matches a timing at which a phase of a targeted position detecting signal changes, and to output the drive voltage.

11 Claims, 14 Drawing Sheets

<COMPARATIVE EXAMPLE>

MOTOR CONTROL CIRCUIT, MOTOR CONTROL INTEGRATED CIRCUIT, AND METHOD FOR CONTROLLABLY DRIVING MOTOR

CROSS-REFERENCE TO RELATED APPLICATIONS

This application claims priority under 35 U.S.C. § 119 to Japanese Patent Application Nos. 2023-112642, filed Jul. 7, 2023, and 2023-137380, filed Aug. 25, 2023, the contents of which are incorporated herein by reference in their entirety.

BACKGROUND

1. Technical Field

The present disclosure relates to a motor control circuit, a motor control integrated circuit, and a method for controllably driving a motor.

2. Description of the Related Art

In order to rotate a brushless direct current (DC) motor with high efficiency, when a rotor equipped with a magnet rotates, a rotation position of the rotor is detected based on an output signal of a Hall element, or by calculating a back electromotive force (BEMF) that is generated through a stator coil, and then a drive current flows in phase with rotation of the rotor (Patent Document 1).

In the above technique, a level of a drive voltage that is applied to the coil in phase with the output signal of the Hall element or the BEMF, and thereby the motor basically rotates in accordance with the drive current through the motor.

RELATED-ART DOCUMENT

Patent Document

Patent Document 1: Japanese Unexamined Patent Application Publication No. 2004-153921

SUMMARY

In one aspect, a motor control circuit for supplying a drive voltage to a brushless direct current (DC) motor via a motor drive unit is provided. The motor control circuit includes a current-zero point detector configured to detect a voltage corresponding to a drive current that flows through a coil of the brushless DC motor, and detect a timing at which the drive current becomes zero; a position-detecting signal generator configured to output a reference position detecting signal based on a Hall signal that is generated by a Hall element; a phase adjuster configured to adjust a phase of a targeted position detecting signal that is present after a subsequent cycle of the reference position detecting signal based on (i) a timing at which the drive current detected by the current-zero point detector becomes zero and (ii) the reference position detecting signal; and a drive controller configured to control a timing at which the drive voltage varies such that the timing of the drive voltage varying matches a timing at which a phase of the targeted position detecting signal changes, and to output the drive voltage.

BRIEF DESCRIPTION OF THE DRAWINGS

FIGS. 6A to 6C are diagrams showing behaviors of the current-zero point detector under different conditions in which the adjustment signal, Offset Enable, is on.

DETAILED DESCRIPTION

The inventors of this application have recognized the following information in related art. Due to characteristics (V=L*dI/dt) of a coil in a brushless DC motor, a drive current varies with a time delay in response to turning on or off a drive voltage. Here, V is a voltage across the coil, L is reactance of the coil, I is a current through the coil, and dI/dt is a time derivative of I. In order to increase a rotational speed of the motor, an increased current is required, and thus the time delay increases in accordance with a larger current.

For this reason, when the motor rotates at a high speed, a phase of the drive current deviates from a phase derived by an actual position of the rotor, and as a result, a driving force is not sufficiently transferred into torque. Even if the current is increased, the rotational speed does not increase proportionally as expected, and ultimately the efficiency decreases.

In view of the situation recognized by the inventor, the present disclosure provides a motor control circuit that can improve the efficiency when a motor rotates at a high speed, rotate the motor at a sufficiently high speed by a predetermined current magnitude, and rotate the motor with a smaller current even at the same rotational speed as described in the motor in the related art.

Various embodiments are described below with reference to the drawings. In each drawing, the same components may be denoted by the same numerals, and duplicate description may be omitted.

Figure 1:
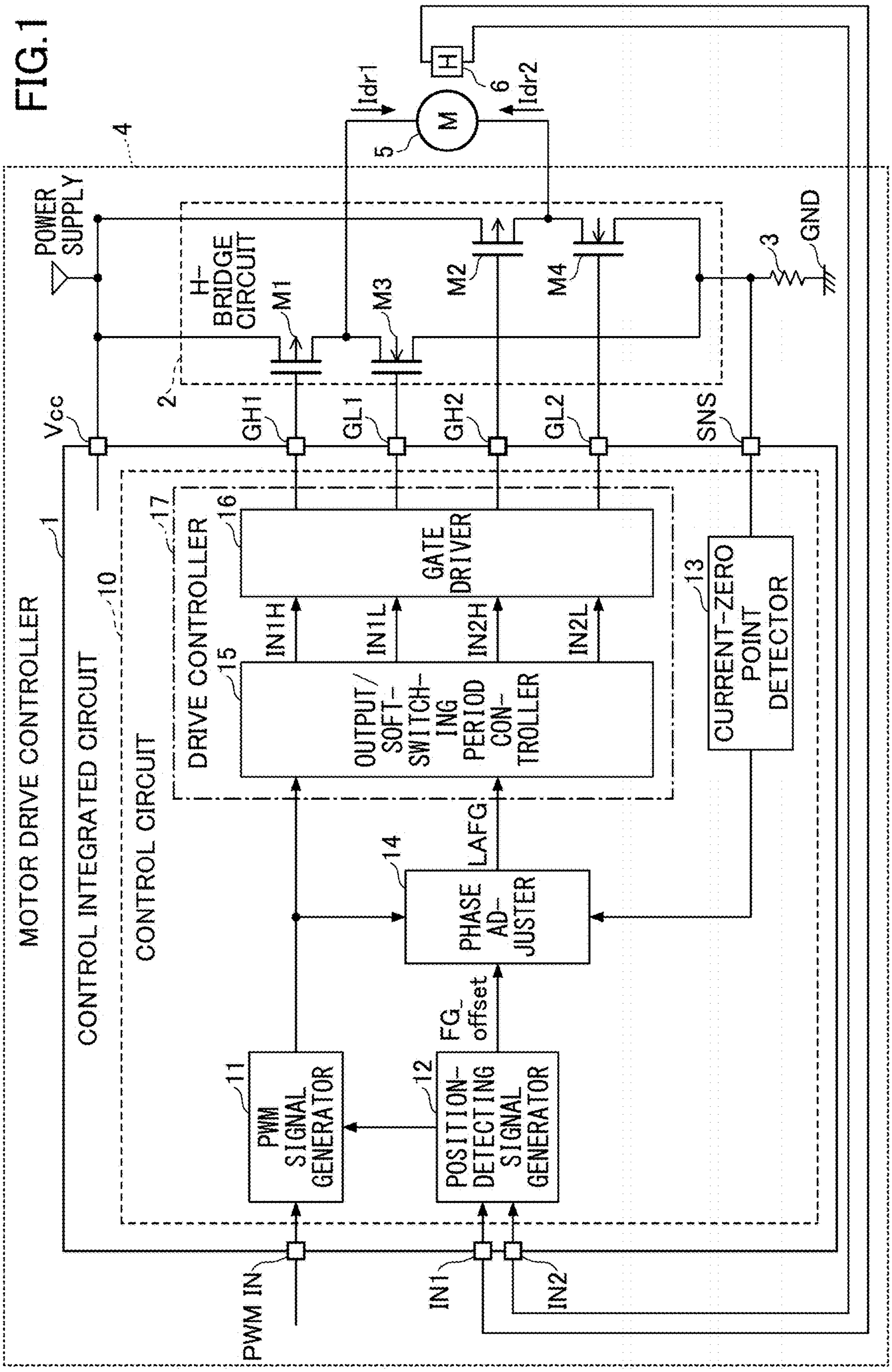
FIG. 1 is a diagram showing a configuration example of a motor drive controller according to one embodiment.
Figure 2:
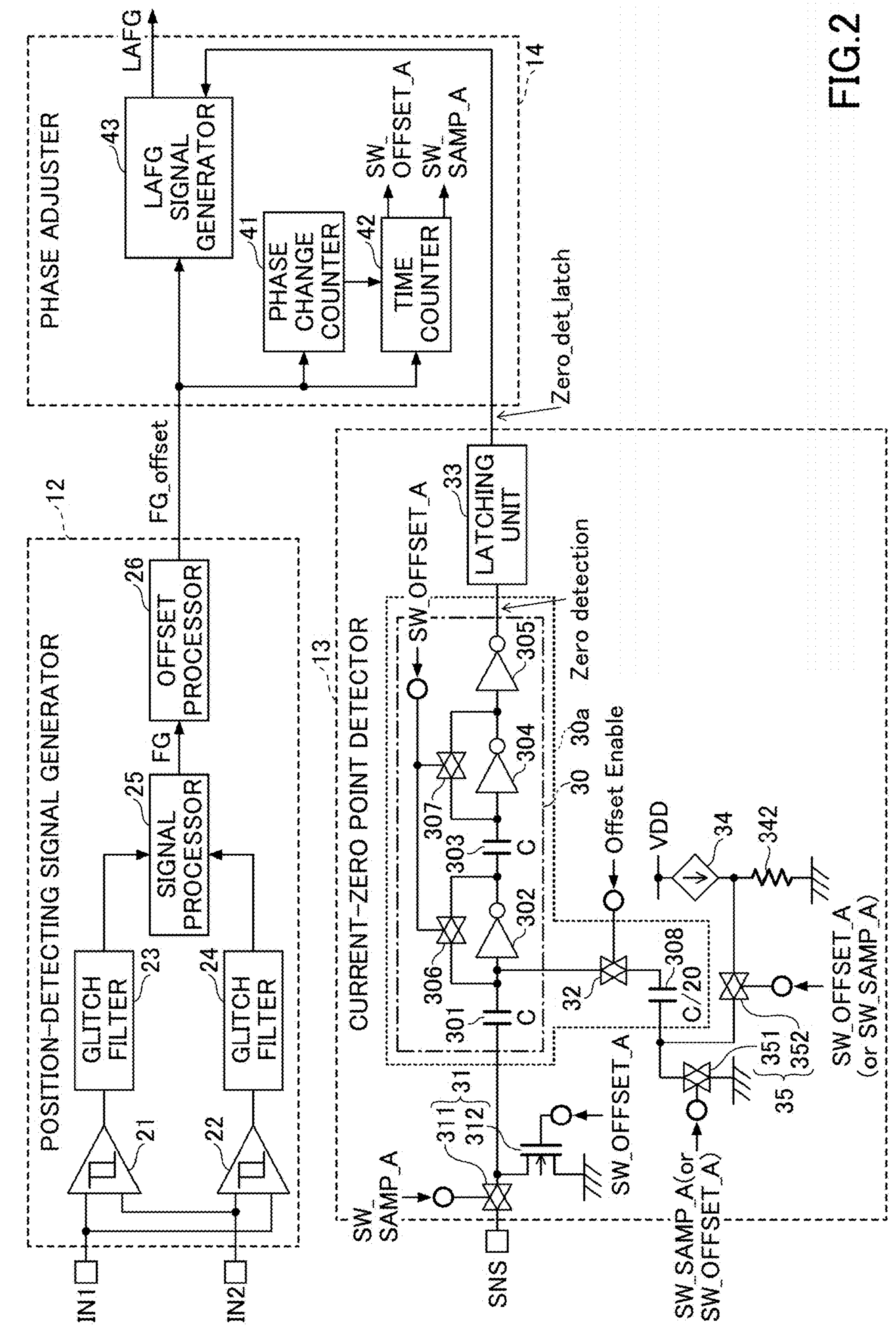
FIG. 2 is a diagram showing an example of circuits of a current-zero point detector, a position-detecting signal generator, and a phase adjuster.

Hereinafter, a configuration of a motor drive controller according to one embodiment will be described with reference to FIGS. 1 and 2. FIG. 1 is a diagram showing a configuration example of the motor drive controller according to the embodiment. FIG. 2 is a diagram showing circuits of a current-zero point detector, a position-detecting signal generator, and a phase adjuster.

A motor drive controller 4 may be incorporated in a fan motor for cooling a heat generating component such as a processor in an electronic device, which includes a notebook personal computer or the like. The motor that is driven by the motor drive controller 4 may include a brushless direct current (DC) motor (BLDC motor).

The motor drive controller 4 includes a circuit that drives a single-phase motor 5 for rotating a cooling fan, for example. The motor drive controller 4 includes a control circuit 10, an H-bridge circuit 2, and a detection resistor 3. A control integrated circuit (IC) (motor control IC) 1 is a semiconductor integrated circuit for controlling a motor drive unit. The control IC 1 includes the control circuit 10 with terminals. The motor drive controller 4 receives a Hall signal from a hall element 6.

The control circuit 10 includes a PWM signal generator 11, a position-detecting signal generator 12, a current-zero point detector 13, a phase adjuster 14, an output/soft-switching controller 15 (hereinafter may be referred to as a controller 15), and a gate driver 16. The controller 15 and the gate driver 16 function as a drive controller 17.

The H-bridge circuit 2 functions as a motor drive unit. The H-bridge circuit 2 includes P-channel FETs M1 and M2 and N-channel FETs M3 and M4. A P-channel FET M1 functions as a first upper switch, an N-channel FET M4 functions as a first lower switch, a P-channel FET M2 functions as a second upper switch, and an N-channel FET M3 functions as a second lower switch.

The detection resistor 3 is connected to the H-bridge circuit 2 and is used to detect the current flowing through a coil L in the single-phase motor 5.

A rotor (not shown) in the single-phase motor 5 is provided with a magnet, and the Hall element 6 is fixed in place to detect a magnetic field from the magnet in the rotor. The Hall element 6 outputs, to respective terminals of the control IC 1, Hall signals IN1 and IN2 each of which corresponds to a voltage level that varies in accordance with strength of a detected magnetic field. When the magnet rotates in accordance with the rotation of the rotor, the Hall element 6 detects changes in the magnetic field based on the rotation of the magnet, and as a result, a position of the rotor is detected. Each of the Hall signals IN1 and IN2 in the present embodiment is, for example, a sinusoidal signal whose amplitude has a predetermined voltage level. The Hall signals IN1 and IN2 are output to the respective terminals of the control IC 1. The Hall signals IN1 and IN2 are not limited to sinusoidal signals.

The position-detecting signal generator 12 compares levels of the Hall signals IN1 and IN2, and generates a frequency generation (FG) signal that is a signal whose frequency changes according to the rotational speed of the single-phase motor 5.

Specifically, the position-detecting signal generator 12 includes hysteresis comparators 21 and 22, glitch filters 23 and 24, a signal processor 25, and an offset processor 26.

Each of the hysteresis comparators 21 and 22 compares the levels of the Hall signals IN1 and IN2. Here, when an inverted signal is input on a short time interval between a signal and the inverted signal, a whisker-like glitch pulse may be generated as an output due to a delay time of noise signal that is caused during a corresponding time period. Each of the glitch filters 23 and 24 removes an unnecessary glitch pulse, and does not adversely affect the signal processor 25 due to the noise, and the signal processor 25 is a logic circuit of a subsequent stage.

In this arrangement, if a level of the Hall signal IN1 is higher than a level of the Hall signal IN2, the signal processor 25 generates the FG signal at a low level (hereinafter referred to as a L level), and if the level of the Hall signal IN1 is lower than the level of the Hall signal IN2, the signal processor 25 generates the FG signal at a high level (hereinafter referred to as a H level).

A predetermined amount of the offset (a time period that is shorter than a phase adjustment range) is stored in the offset processor 26. During steady rotation, the offset processor 26 outputs a position detecting signal, FG_offset, to cause the phase of the FG signal to be advanced. The FG signal is the position detecting signal.

In this arrangement, when the motor starts, the position-detecting signal generator 12 outputs the position detecting signal FG that matches the Hall signal generated by the Hall element and that is used as a reference. When the motor rotates steadily, the position detecting signal, FG_offset, whose phase is advanced (offset) by a predetermined amount with respect to the Hall signal, is output as a reference. With this approach, during unstable rotation such as at startup, at a position at which an actual Hall signal is switched to cause the motor to operate reliably, the motor is driven. In contract, during steady rotation, the motor is driven at a position suitable for characteristics of the motor. In this example, the phase of the position detecting signal, FG_offset, is advanced with respect to the position detecting signal FG. However, the position detecting signal, FG_offset, may be a signal whose phase is delayed with respect to the position detecting signal FG by a predetermined amount, taking account into a situation.

Based on the position-detecting signal, FG or FG_offset, the pulse width modulation (PWM) signal generator 11 generates a PWM signal that is a switching signal to drive any FETs among the P-channel FETs M1 and M2 and the N-channel FETs M3 and M4, which constitute the H-bridge circuit 2.

A duty ratio for the PWM signal generated by the PWM signal generator 11 is fixed, and an output voltage Vout does not vary. Under such a control, when the drive voltage varies, soft-switching is performed so that a level of the drive voltage changes gradually to high (H) or low (L). The soft-switching is performed under the control of the controller 15 at a subsequent stage.

The current-zero point detector 13 detects a voltage Vsns between the H-bridge circuit 2 and the detection resistor 3 during a current monitoring period, which is an angle period before and after a timing at which the phase of a reference position-detecting signal changes.

The voltage Vsns between the H-bridge circuit 2 and the detection resistor 3 is calculated by an equation "(constant resistance value Rsns of the detection resistor 3)×(current Idr flowing through the coil L). In this case, the detection voltage Vsns is a voltage corresponding to the drive current Idr flowing through the coil L.

A sampling signal, SW_SAMP_A, a standby signal, SW_OFFSET_A, and an adjustment signal, Offset Enable, are input to the current-zero point detector 13. The adjustment signal, Offset Enable, is turned on in order to improve or correct motor characteristics or the like. For example, when an offset is added to an actual Vsns level or a reference GND (ground) level due to wiring impedance, the adjustment signal is used to cancel the offset. In other words, the adjustment signal, Offset Enable, is not turned on or off in accordance with any operations, but instead is used for initial setting as to whether the offset is added to a level in a detected current-zero point.

Specifically, the current-zero point detector 13 includes a switch group 31, a voltage comparison circuit 30, and a latching unit 33, which constitute a permanently installed circuit that is used regardless of whether the adjustment signal, Offset Enable, is turned on or off. Switches 311 and 312 in the switch group 31 switch a voltage of an input terminal of the voltage comparison circuit 30 between the detection voltage Vsns and a ground voltage GND, by taking into account an on-off (or high-low) state of each of two signals, namely the sampling signal, SW_SAMP_A, and the standby signal, SW_OFFSET_A. The voltage comparison circuit 30 includes capacitors 301 and 303, and inverters 302, 304 and 305. The voltage comparison circuit 30 also includes switches 306 and 307 for short-circuiting the respective inverters 302 and 304. The latching unit 33 outputs a state signal, Zero_det_latch, based on a result of a zero point output, Zero detection, which is an output of the voltage comparison circuit 30.

Further, the current zero detector 13 includes an additional offset circuit (adjustment circuit) that is used only when the adjustment signal, Offset Enable, is on. The additional offset circuit includes a switch 32, a constant voltage source 34 connected to a resistor 342, a switch group 35, and a capacitor 308. When the adjustment signal, Offset Enable, is on, the switch 32 becomes on, and thus the adjustment circuit is connected to the current zero detector 13. With this approach, the capacitor 308 is connected to the current zero detector 13 as a portion of the voltage comparison circuit 30*a*, and the constant voltage source 34 or the ground voltage GND is applied to the capacitor 308 in accordance with the operation by the switch group 35.

More specifically, when the adjustment signal, Offset Enable, is on, the capacitor (offset capacitor) 308 is connected in parallel with the capacitor 301 at a front stage of the invertor 302, as a portion of the voltage comparison circuit 30*a*. The constant voltage source 34 generates a predetermined constant voltage that serves as an offset voltage. Based on an on-off state of each of the sampling signal, SW_SAMP_A, and the standby signal, SW_OFFSET_A, the switches 351 and 352 in the switch group 35 change a voltage of an input end of the offset capacitor 308 to a voltage Vofs from the constant voltage source 34 or the ground voltage GND. In this case, the voltage comparison circuit 30*a* compares a value that is an offset from the GND level, with the detection voltage Vsns, and then outputs a comparison result. In this arrangement, the constant voltage source 34 that generates an offset level is selectively used in accordance with a state of the adjustment signal, Offset Enable.

As shown in FIG. 2 and FIG. 4 below, when the switch 32 becomes off in accordance with the adjustment signal, Offset Enable, the current-zero point detector 13 turns on or off each of internal switches 311, 312, 306, and 307, in accordance with (i) the sampling signal, SW_SAMP_A, used during detection of the current-zero point and (ii) the standby signal, SW_OFFSET_A, used during a current-detection standby period within the current monitoring period.

During a time period in which the sampling signal, SW_SAMP_A, is input, the current-zero point detector 13 compares a voltage of each of the capacitors 301 and 303 with the ground voltage, by using the inverters 302, 304, and 305 each of which functions as a comparator. If the detection voltage Vsns is less than zero, a zero point output, Zero detection, becomes H at a timing at which the sampling signal, SW_SAMP_A, is input. Details of the behavior of the current-zero point detector 13 will be described with reference to FIGS. 4A to 6C.

The latching unit 33 sets the state notification signal, Zero_det_latch, which is a latch output signal and a continuous signal, to be H at a timing at which the sampling signal, SW_SAMP_A, falls to L. In this case, after maintaining the state notification signal at a H level until a subsequent sampling signal, SW_SAMP_A, falls, the latching unit 33 takes a state of the zero point output, Zero detection, again at a timing at which the sampling signal, SW_SAMP_A, falls. If the zero point output, Zero detection, is H, the output state notification signal, Zero_det_latch, is maintained at the H level. If Vsns becomes greater than zero, and Zero detection becomes L, the output state notification signal, Zero_det_latch, changes to L, and the resulting L level is maintained until a subsequent sampling signal, SW_SAMP_Am, falls. Such a process is repeated for each predetermined current monitoring period. Details of the behavior of the current-zero point detector 13 will be described below with reference to FIGS. 8 and 10.

With this arrangement, during the current monitoring period, the current-zero point detector 13 sets, as a state of the motor current, a continuous state notification signal, Zero_det_latch, that is different from a discrete signal that is obtained with the PWM. With this approach, a timing at which the detection state exits, corresponding to a timing at which the state notification signal, Zero_det_latch, indicating a state of the drive current, can be recognized as a timing at which the current flows in a positive direction such that a current magnitude increases from zero, without the influence by an on-off operation with the PWM.

Based on both an output result of the current-zero point detector 13 and the reference position-detecting signal, FG or FG_offset, the phase adjuster 14 adjusts the phase of a targeted position-detecting signal that is obtained in a subsequent cycle of the reference position-detecting signal, and outputs the targeted position-detecting signal whose phase is adjusted, as a lead-angle position-detecting signal (Lead_angle FG, hereinafter may be referred to as a LAFG signal).

Specifically, as shown in FIG. 2, the phase adjuster 14 includes a phase change counter 41, a time counter 42, and a LAFG signal generator 43.

The phase change counter 41 counts the number of times (in this example, the number of times a signal changes from H to L) a phase of the position-detecting signal (FG or FG_offset) changes. The position-detecting signal is output from the position-detecting signal generator 12.

In an example, during steady-state rotation, the phase of the drive current is adjusted (lead angle) every sixteen times the phase of the FG signal changes. In this case, the phase change counter 41 counts the number k of times the above phase changes. When the number k reaches fifteen after a previous phase adjustment is performed, the time counter 42 starts the count in order to monitor the current-zero point through the current-zero point detector 13.

The time counter 42 counts a time so as to monitor the current-zero point at a time near a timing at which the phase of a targeted FG signal changes. The time counter 42 counts the time during a half-cycle T of an immediately preceding FG signal (or FG_offset signal). If the time becomes the time that is expressed by $T\times(180°-\theta)/180°$), the time counter 42 starts the monitor of the current-zero point (current-zero cross point), and then sets a current monitoring period.

During the current monitoring period, the time counter 42 outputs, to the current-zero point detector 13, (i) the sampling signal, SW_SAMP_A, that is used during detection of the current-zero point, and (ii) the standby signal, SW_OFFSET_A, that is used during a time period other than a time period during which the current is detected. If a time period that is expressed by (the half-cycle T)$\times(180°+\theta)/180°$) has elapsed, the monitoring of the current-zero point is terminated. Here, θ is set to any value from 30° to 60°, for example.

The LAFG signal generator 43 outputs the LAFG signal that is the FG signal whose phase is adjusted (advanced or delayed) with respect to the FG signal or the FG_offset signal, and the FG signal is based on a detection result of the current-zero point.

The controller 15 adjusts, based on the LAFG signal, a timing at which the drive voltage varies under the control that is performed by the PWM signal, that is, a timing at which the voltage is turned on or off.

In addition, the controller 15 internally generates a signal to instruct a time period during which the single-phase motor 5 is soft switched based on (i) a voltage generated internally and (ii) the position-detecting signal, FG or FG_offset, output from the position-detecting signal generator.

With this arrangement, the controller 15 gradually changes a duty ratio immediately before a timing at which the FG signal or FG_offset signal is inverted. When the output voltage Vout is increased as in a time period Ti in FIG. 7, the duty ratio is gradually increased, and when the output voltage Vout is decreased as in a time period Td, the duty ratio is gradually decreased. When a soft switch period has elapsed, the duty ratio for the PWM signal becomes a predetermined value or zero.

Then, the controller 15 generates control signals IN1H, IN2H, IN1L, and IN2L, which are set such that soft-switching in which an interval between H and L changes gradually is performed during switching of the drive voltage for switching any FETs among the FETs M1, M2, M3, and M4 of the H-bridge circuit 2. Then, the controller 15 outputs the control signals to the gate driver 16.

The gate driver 16 controls each MOSFET in the H-bridge circuit 2, and varies the drive current Idr to drive the motor coil L of the single-phase motor 5. Specifically, the gate driver 16 outputs gate control voltages GH1, GH2, GL1, and GL2 to turn on and/or off gates of FETs M1, M2, M3, and M4 in the H-bridge circuit 2, respectively.

Figure 3:
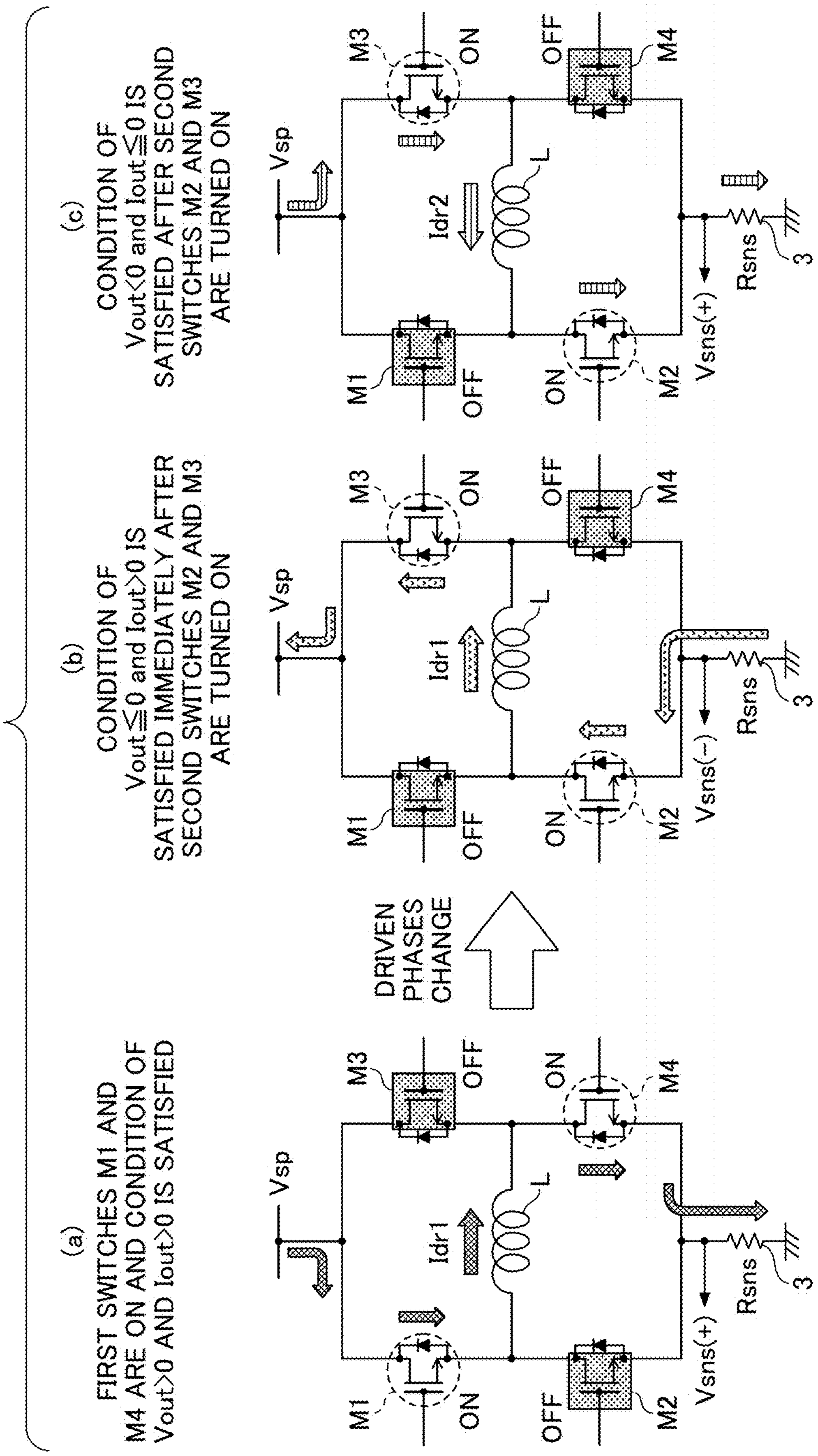
FIG. 3 is a diagram for describing an example of a current flow through an H-bridge circuit and a motor when a phase of a drive voltage is inverted.

Hereinafter, the flow of the drive current will be described with reference to FIG. 3. FIG. 3 is a diagram for describing a current flow through the H-bridge circuit 2 when inverting the phase of the drive voltage. In FIG. 3, (a) shows the current flow when the first switches M1 and M4 are on before switching the FG signal, (b) shows the current flow when the second switches M2 and M3 are on immediately after the switching, and (c) shows the current flow when the second switches M2 and M3 are on after a little time period elapsed since the switching. In FIG. 3, the single-phase motor 5 is expressed as the coil L. The single-phase motor 5 includes other targets such as a reverse voltage and resistance, but these targets are omitted in FIG. 3.

When generating a positive drive current Iout, for example, the gate driver 16 turns off FETs M2 and M3 that constitute a second switch, and turns on FETs M1 and M4 that constitute a first switch, in accordance with the PWM signal. Then, a positive drive voltage Vout is generated, and as shown in FIG. 3(*a*), the drive current flows through the motor coil L in a direction Idr1. A + side detection voltage Vsns occurs across the detection resistor 3.

When the current flows through the motor coil L in the direction Idr1, for example, the gate driver 16 switches driven phases to turn off FETs M1 and M4 and turn on FETs M2 and M3. In this case, a direction in which the current flows through the coil cannot change rapidly due to characteristics of the coil, and thus the current flows in the direction Idr1 through the FETs M2 and M3 that are turned on. At this point, the drive voltage Vout becomes negative, while the drive current Iout is still positive.

The current flowing in the above direction from the GND through the detection resistor 3 flows, as a negative current, from a source to a drain in each of FETs M2 and M3. In other words, the current flows in a direction expressed by an arrow in FIG. 3(*b*) such that the current magnitude increases from the GND level, and thus a negative detection voltage Vsns is applied across the detection resistor 3.

When a further time period has elapsed, the direction of the current flowing through the coil L changes, and the current flows as shown in FIG. 3(*c*). In this case, the drive current flows through the motor coil L of the motor 5 in a direction Idr2. At this time, the drive voltage Vout is negative, the drive current Iout is negative, and a positive voltage Vsns is applied across the detection resistor 3.

(Details of Behavior of Current-Zero Point Detector)

Figure 4A:
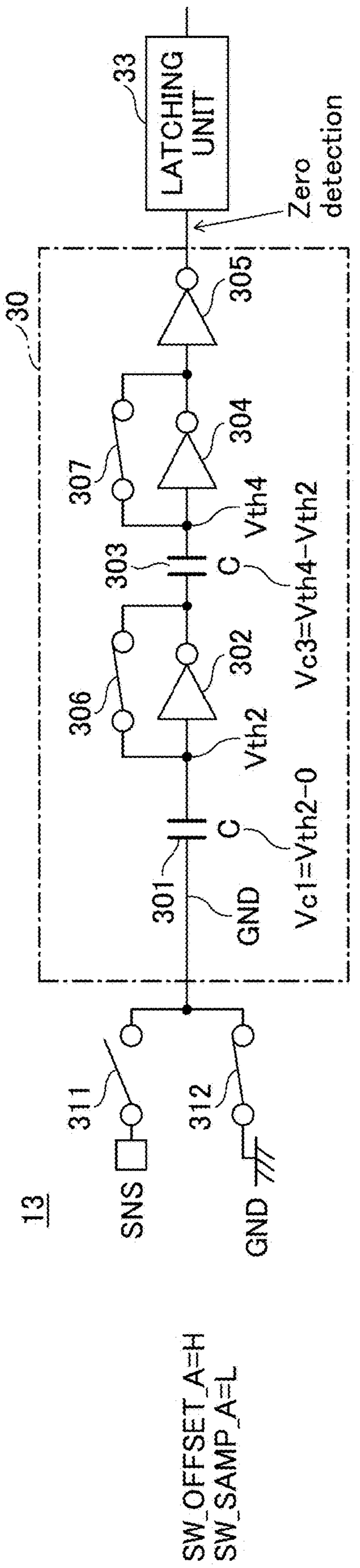
FIGS. 4A to 4C are diagrams showing behaviors of the current-zero point detector under different conditions in which an adjustment signal, Offset Enable, is off.
Figure 4B:
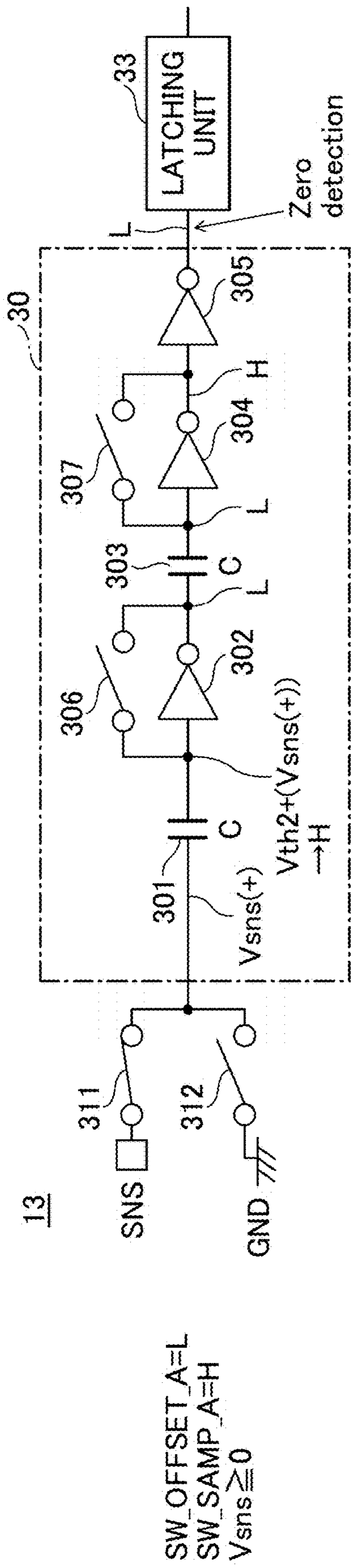
Figure 4C:
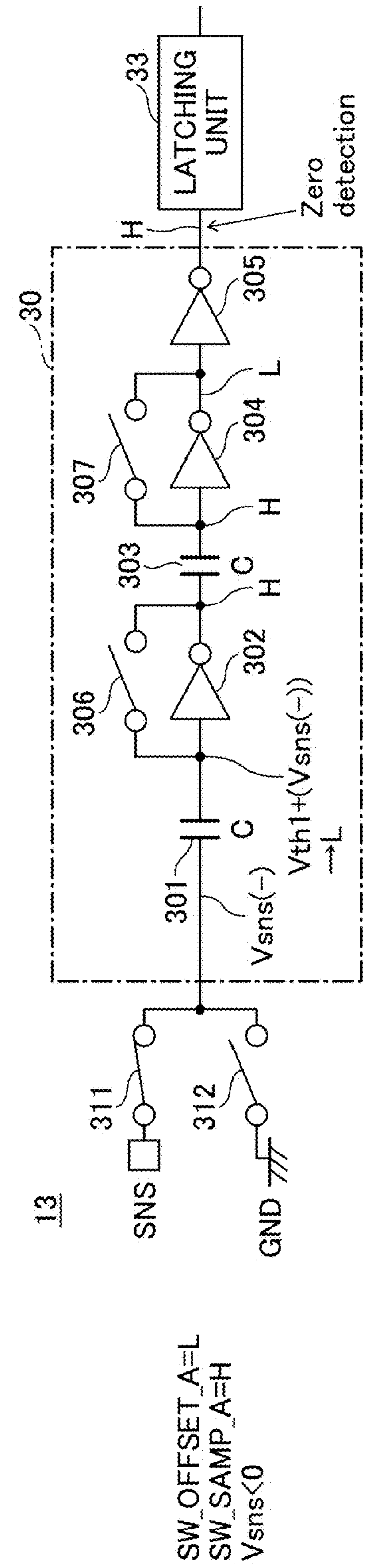
Figure 5:
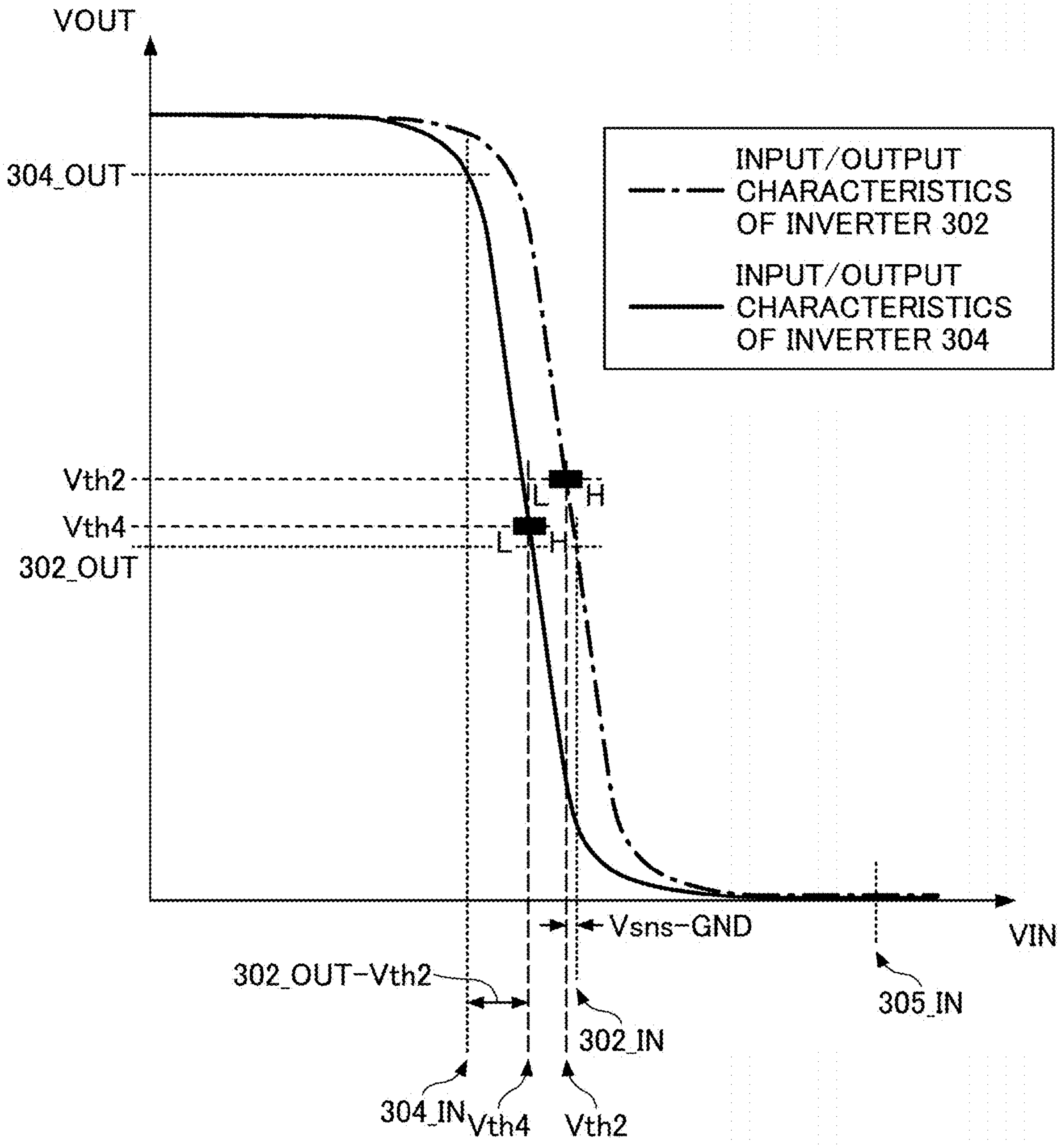
FIG. 5 is a diagram showing input/output characteristics of each inverter included in the current-zero point detector.
Figure 6A:
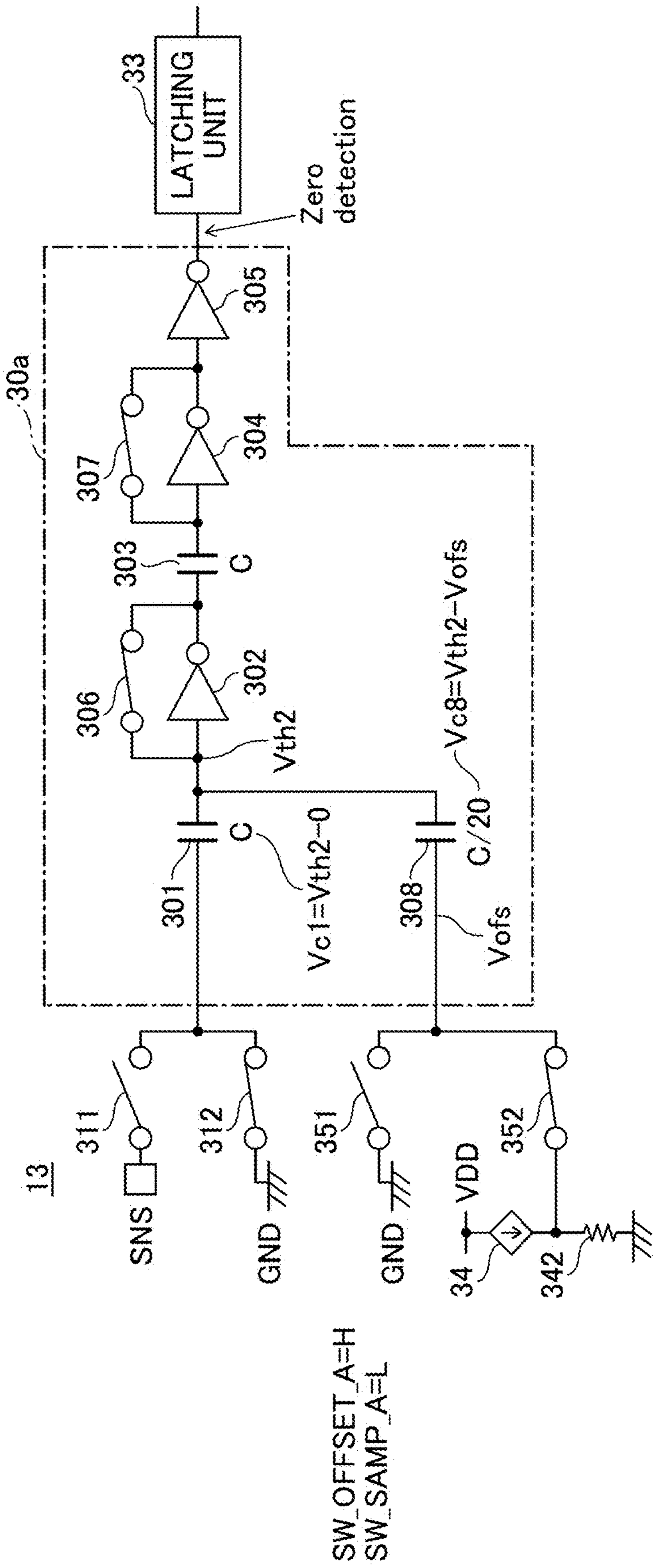
Figure 6B:
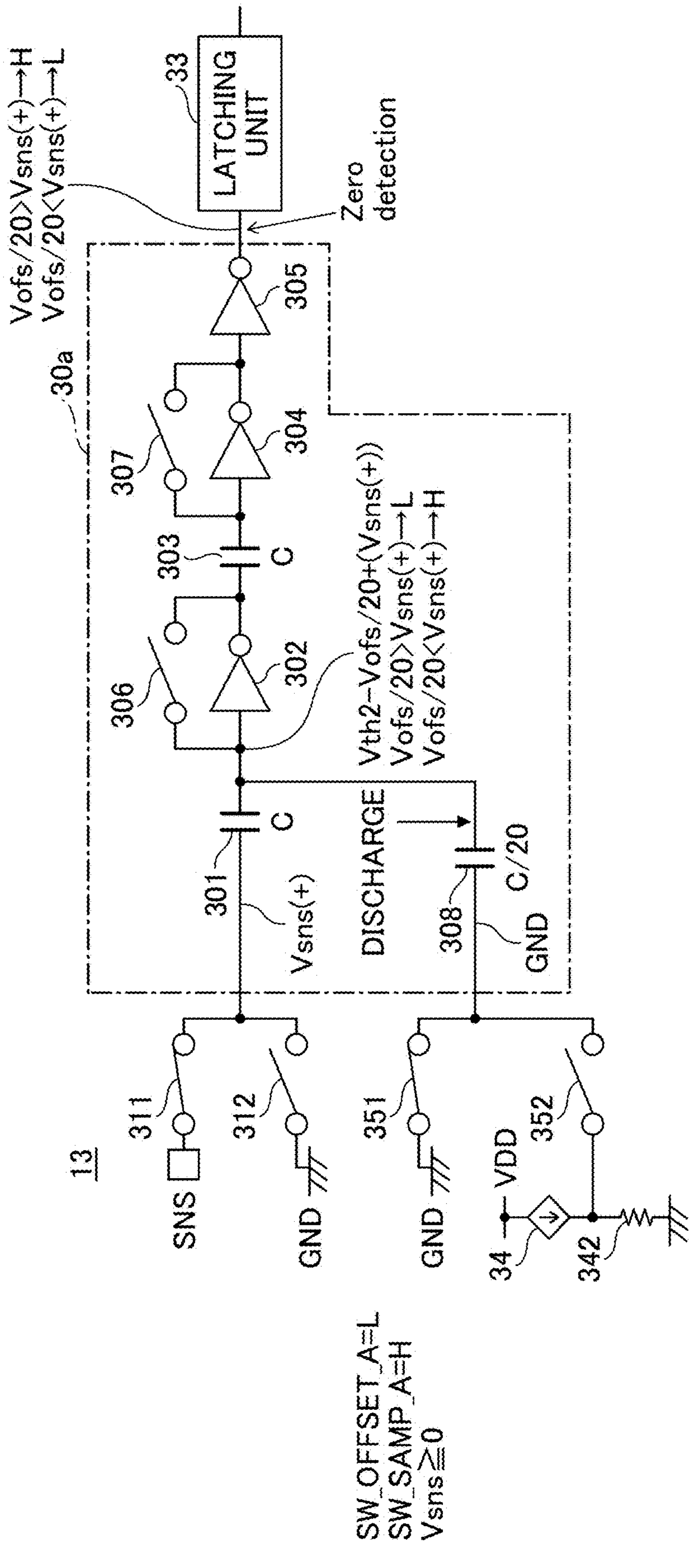
Figure 6C:
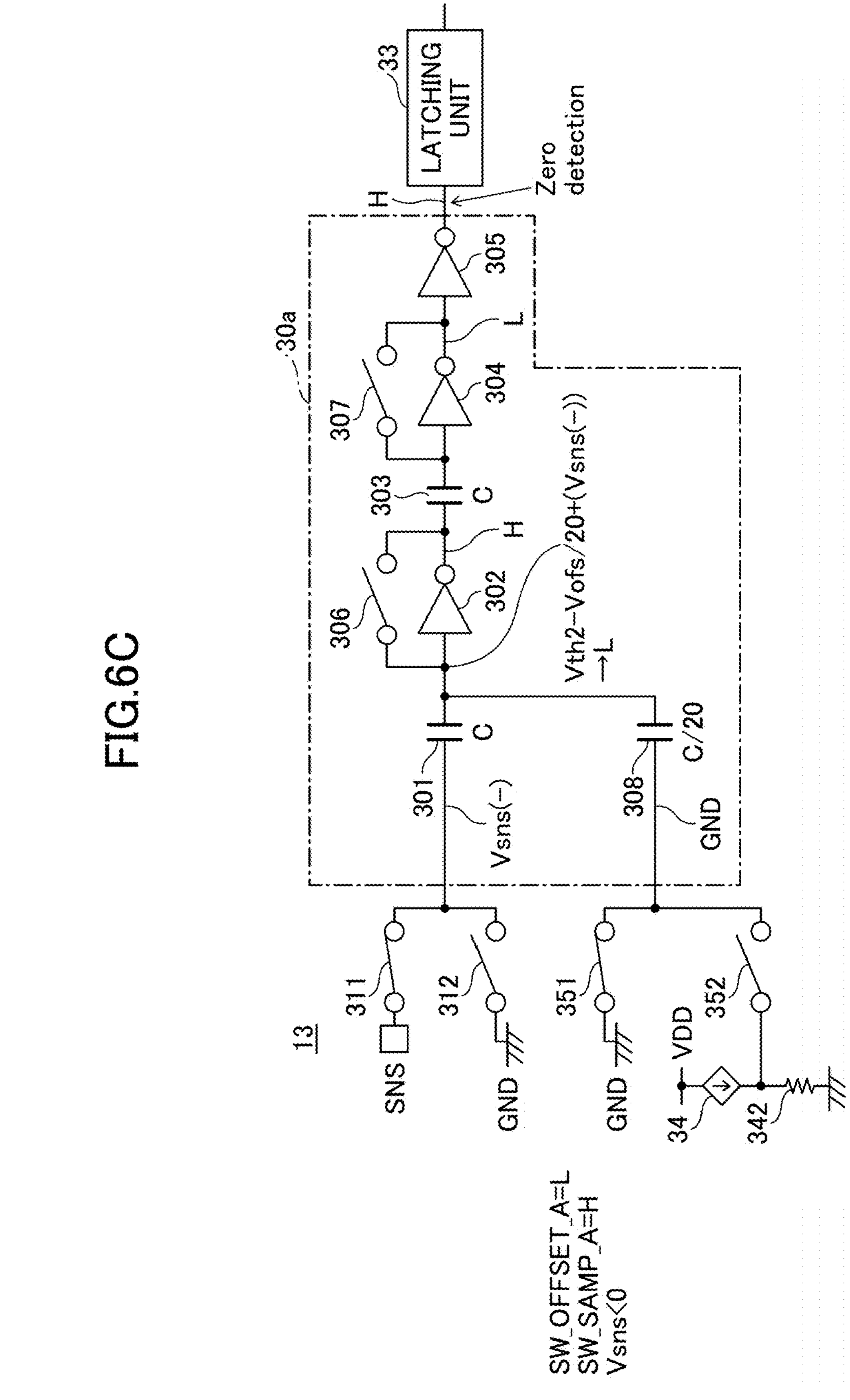

Hereinafter, the behavior of the current-zero point detector 13 will be described in detail with reference to FIGS. 4A to 6C. FIGS. 4A to 4C are diagrams showing behaviors of the current-zero point detector 13 under different conditions in which the adjustment signal, Offset Enable, is off. FIG. 5 is a diagram showing the input/output characteristic of each inverter included in the current-zero point detector 13. FIGS. 6A to 6C are diagrams showing the behaviors of the current-zero point detector 13 under different conditions in which the adjustment signal, Offset Enable, is on.

First, the behavior of the current-zero point detector 13 in a case where the adjustment signal, Offset Enable, is off will be described with reference to FIGS. 4A to 5. When the adjustment signal, Offset Enable, is off, the switch 32 is turned off, and the switch 32, the constant voltage source 34, the switch group 35, and the capacitor 308, which are constituted by the adjustment circuit, are not used constantly. Thus, these components are omitted in FIGS. 4A to 4C.

Specifically, as shown in FIG. 4A, in the current-zero point detector 13, when SW_OFFSET_A is at the H level and SW_SAMP_A is at the L level, in a case where the switch (FET) 312 is turned on, one end of the capacitor 301 is grounded at the GND level. Also, when the switch 306 is turned on, the input/output of the inverter 302 becomes at an intermediate potential Vth2, which is neither H nor L, according to characteristics of the inverter, and the other end of the capacitor 301 is charged at the intermediate potential Vth2. With this arrangement, the capacitor 301 stores a charge that is defined by a difference (Vc1=Vth2−zero) between the intermediate potential Vth2 and a potential at a ground level. Also, when the switch 307 is turned on, the input/output of the inverter 304 is at an intermediate potential Vth4 that is neither H nor L, according to inverter characteristics, and one end of the capacitor 303 is charged at the intermediate potential Vth2 that is caused by the inverter 302, and the other end of the capacitor 303 is charged at the intermediate potential Vth4 that is caused by the inverter 304. As a result, the capacitor 303 stores a charge that is defined by a difference (Vc3=Vth4−Vth2) between the intermediate potential Vth4 and the intermediate potential Vth2. With this approach, with use of the GND level as a reference, offset voltages (Vc1 and Vc3) that are applied across the capacitors 301 and 303 are used as operating points of the inverters 302 and 304, respectively.

Hereinafter, an inverter threshold for the current-zero detector will be described with reference to FIG. 5. FIG. 5 is a diagram showing input/output characteristics of inverters 302 and 304 included in the current-zero detector.

Assuming that the two inverters have slightly different characteristics, in FIG. 5, the input/output characteristics of a first-stage inverter 302 are expressed by a dash-dot line, and the input/output characteristics of a second-stage inverter 304 are expressed by a solid line.

In the voltage comparison circuit 30, a level difference (Vsns−GND) for a first-stage input voltage needs to be detected in the range of very small levels. In this case, the level difference (Vsns−GND (0)) is amplified to a value (302_OUT−Vth2) by the first-stage inverter 302. Even if characteristics of the inverters are different from each other, with used of the capacitor 303 of an input side, an intermediate potential Vth4 is added to 302_OUT−Vth2, and the resulting voltage is applied to the second-stage inverter 304. Then, the resulting signal is amplified by the inverter 304, and the signal becomes 304_OUT, which is very close to the H level. When such an amplification is performed, it can be seen that an input 305_IN (=304_OUT) of the inverter 305 of a third stage causes an output of the inverter 305 of the third stage to be at an "L level."

As described above, an objective of inverters at three stages is to increase a signal level, and each of the capacitors 301 and 303 can add an input voltage level of a corresponding inverter, with reference to a threshold for the inverter, without being affected by the characteristics of the inverter. In this arrangement, a small voltage magnitude of the detection voltage Vsns can be ultimately output with use of two levels, H and L.

Specifically, as shown in FIG. 4A, after the charge corresponding to the offset voltage is stored at each of the capacitors 303 and 304, the standby signal, SW_OFFSET_A, changes to the L level, and the sampling signal, SW_SAMP_A, changes to the H level. In this case, as shown in FIG. 4B, the switch (FET) 312 is turned off, the switch 311 is turned on, and ultimately one end of the capacitor 301 is charged based on the detection voltage Vsns. When the detection voltage Vsns is higher than the GND level as shown in FIGS. 3A and 3C, the voltage of the other end of the capacitor 301 is increased (Vth2+Vsns) from the intermediate potential by the potential of Vsns, in accordance with the offset voltage that is applied across the capacitor 301.

In the state shown in FIG. 4B, the switches 306 and 307 are off, and the inverters 302 and 304 purely operate as inverters. When the detection voltage Vsns is higher than the GND level, as described above, the input voltage of the inverter 302 is increased from the intermediate potential Vth2 by a potential of Vsns. As a result, the input voltage of the inverter 302 becomes higher than that of the inverter 302 whose phase changes, and thus an input of the inverter 302 becomes H, and an output of the inverter 302 changes to L. In addition, the inverter 302 outputs an output voltage, 302_OUT, as shown in FIG. 5.

In the capacitor 303 of a subsequent stage, the capacitor 303 is charged (Vc3=Vth4−(302_OUT−Vth2)) at a divided potential of (302_OUT−Vth2), in addition to an originally stored intermediate potential Vth4, in accordance with an output voltage of the inverter 302. In this arrangement, as shown in FIG. 5, the input of the inverter 304 becomes lower than that at a phase change point, and becomes L. Thus, the output voltage of the inverter 304 becomes H. In addition, the inverter 305 of a subsequent stage behaves in an opposite manner to the behavior of the inverter 304. When an input of the inverter 305 becomes H, an output of the inverter 305, namely a Zero_detection signal, becomes L.

On the other hand, when the detection voltage Vsns is lower than the GND level as shown in the state in FIG. 3(*b*), the voltage of the other end of the capacitor 301 as shown in FIG. 4C is decreased (Vc1=Vth2−Vsns) from the intermediate potential Vth2 by the potential of Vsns, in accordance with the offset voltage that is applied across the capacitor 301. As a result, the input of the inverter 302 becomes L, and the output of the inverter 302 changes to H. Thereafter, the capacitor 303, the switch 307, and the inverter 304 behave in the same manner as described above. When the input of the inverter 304 becomes H, the output of the inverter 304 becomes L, and when the input of the inverter 305 becomes L, the output of the inverter 305, i.e., the zero_detection signal, becomes H.

The Zero_detection signal that is from the output of the voltage comparison circuit 30 is input to the latching unit 33. Then, the latching unit 33 outputs a continuous state notification signal, Zero_det_latch, which changes to H or L, only when the L or H level of the Zero_detection signal changes for a preceding and subsequent on periods that are discrete on durations during which the detection voltage Vsns is applied to the switch 311 (see FIG. 8).

As described above, the current-zero point detector 13 detects a timing at which the magnitude of the voltage Vsns corresponding to the output current Iout changes from either zero or a negative level to a positive level, to thereby detect that the drive current indicates a zero point, and then sends a notification at a timing at which the state notification signal, Zero_det_latch, changes from H to L.

Hereinafter, the behavior of the current-zero point detector 13 in a case where the adjustment signal, Offset Enable, is on will be described with reference to FIGS. 6A to 6C. In an adjustment circuit shown in a schematic example in FIGS. 6A to 6C, the standby signal, SW_OFFSET_A, is applied to the switch 351, and the sampling signal, SW_SAMP_A, is applied to the switch 352, in order to set a positive-side offset. In this arrangement, when the switch 32 is turned on by the adjustment signal, Offset Enable, the current-zero point detector 13 turns on or off each of internal switches 311, 312, 306, and 307, and switches 351 and 352, by (i) the sampling signal, SW_SAMP_A, that is used during detection of the current-zero point and (ii) the signal, SW_OFFSET_A, that is used during the current-detection standby period within the current monitoring period.

Specifically, as shown in FIG. 6A, in the current-zero point detector 13, when the standby signal, SW_OFFSET_A, is H and the sampling signal, SW_SAMP_A, is L, the switch (FET) 312 is turned on, and the switch 352 in the adjustment circuit is turned on. As a result, a voltage (voltage supplied from the constant voltage source) Vofs that is derived by the ground and the constant voltage VDD, which is supplied by the constant voltage source 34 through the resistor 342, is applied to one end of the capacitor 308. On the other hand, the other end of the capacitor 308 becomes at the intermediate potential Vth2 at which a point is connected to the other end of capacitor 308. In this case, the capacitor 308 has a difference (Vc8=Vth2−Vofs) between Vth2 and Vofs. In such a state, the capacitors 301 and 308 are connected in parallel with respect to the inverter 302, and an offset voltage (Vc1) applied across the capacitor 301 in a case where the GND level is used as a reference is compared with an offset voltage (Vc8) applied across the capacitor 301 in the case where the GND level is used as a reference. The resulting voltage that is obtained by charging and discharging is set as a reference of an operating point of the inverter 302.

After the charge corresponding to the offset voltage is stored at each of the capacitors 303, 304, and 308, the standby signal, SW_OFFSET_A, changes to L, and the sampling signal, SW_SAMP_A, changes to H. As a result, as shown in FIG. 6B, the detection voltage Vsns is supplied to one end of the capacitor 301 by turning off the switch (FET) 312 and turning on the switch 311. Further, when the switch 351 is turned on, the charge is discharged from the capacitor 301 and is directed to the capacitor 308 as shown in FIG. 6B. When the capacitor 308 has capacitance that is 1/20 capacitance of the capacitor 301, the input voltage of the inverter 302 is expressed by (Vth2−Vofs/20+Vsns).

If the detection voltage Vsns is higher than the GND level as shown in (a) and (c) of FIG. 3, the detection voltage Vsns is further compared with a voltage that is defined by dividing the detection voltage Vofs by twenty. If the detection voltage Vsns is higher than the voltage defined by dividing the detection voltage Vofs by twenty, a condition of "Vth2−Vofs/20+(Vsns(+))>Vth2" is satisfied. As a result, the input of the inverter 302 becomes H, and the output of the inverter 302 changes to L. Thereafter, the capacitor 303, the switch 307, and the inverter 304 behave in the same manner as described above. As a result, when the input of the inverter 304 becomes L, the output of the inverter 304 becomes H, and when the input of the inverter 305 becomes H, the output of the inverter 305, i.e., the Zero_detection signal, becomes L.

On the other hand, if the detection voltage Vsns is compared with the voltage that is defined by dividing the offset voltage Vofs by twenty, and the positive detection voltage (Vsns) is higher than the voltage defined by dividing the positive offset voltage Vofs by twenty, the condition of "Vth2−Vofs/20+(Vsns(+))<Vth2" is satisfied. In this case, the input of the inverter 302 becomes L, and the output of the inverter 302 changes to H. Thereafter, the capacitor 303, the switch 307, and the inverter 304 behave in the same manner as described above. As a result, when the input of the inverter 304 becomes H, the output of the inverter 304 becomes L, and when the input of the inverter 305 becomes L, the output of the inverter 305, i.e., the Zero_detection signal, becomes H.

When the magnitude of the detection voltage Vsns is negative as shown in FIG. 3(*b*), the condition "Vth2−Vofs/20+(Vsns(−))<Vth2" is satisfied without performing a comparison relating to Vofs/20 as shown in FIG. 6C. As a result, the input of the inverter 302 becomes L, and the output of the inverter 302 changes to H. Thereafter, the capacitor 303, the switch 307, and the inverter 304 behave in the same manner as described above. As a result, when the input of the inverter 304 becomes H, the output of the inverter 304 becomes L, and when the input of the inverter 305 becomes L, the output signal of the inverter 305, i.e., the Zero_detection signal, becomes H.

As described above, by enabling the adjustment circuit with the constant voltage source 34 in accordance with the adjustment signal, Offset Enable, a threshold level for the inverter 302 in the voltage comparison circuit can be offset from the GND level. That is, in the example shown in FIGS. 6A to 6C, the zero point for the detection voltage Vsns changes from the GND level by a positive magnitude of the voltage defined by Vofs/20.

Note that in FIGS. 6A to 6C, the zero point of the detection voltage Vsns changes from the GND level by the positive magnitude of the voltage defined by Vofs/20, when the standby signal, SW_OFFSET_A, is applied to the switch 351 and the sampling signal, SW_SAMP_A, is applied to the switch 352. However, when the standby signal, SW_OFFSET_A, is applied to the switch 352 and the sampling signal, SW_SAMP_A, is applied to the switch 351 as shown in parentheses in FIG. 2, the zero point of the detection voltage Vsns can change from the GND level by a negative magnitude of the voltage defined by Vofs/20

In generating an offset using the above additional adjustment circuit, in a case where there is a discrepancy between the GND level of the motor obtained by the current-zero point detector 13 and the GND level of a device (the entire motor driving device 4) due to, for example, a difference or the like between wiring impedance, the discrepancy is corrected. Alternatively, in a case where false detection or malfunction occurs due to a small noise that is generated near the GND, an offset is used to avoid the false detection. For such a purpose of correcting the discrepancy or avoiding the false detection or malfunction, an adjustment function is enabled or disabled. The adjustment function is enabled or disabled at a timing other than the current monitoring period, without being linked to the FG period.

Comparative Example

Figure 7:
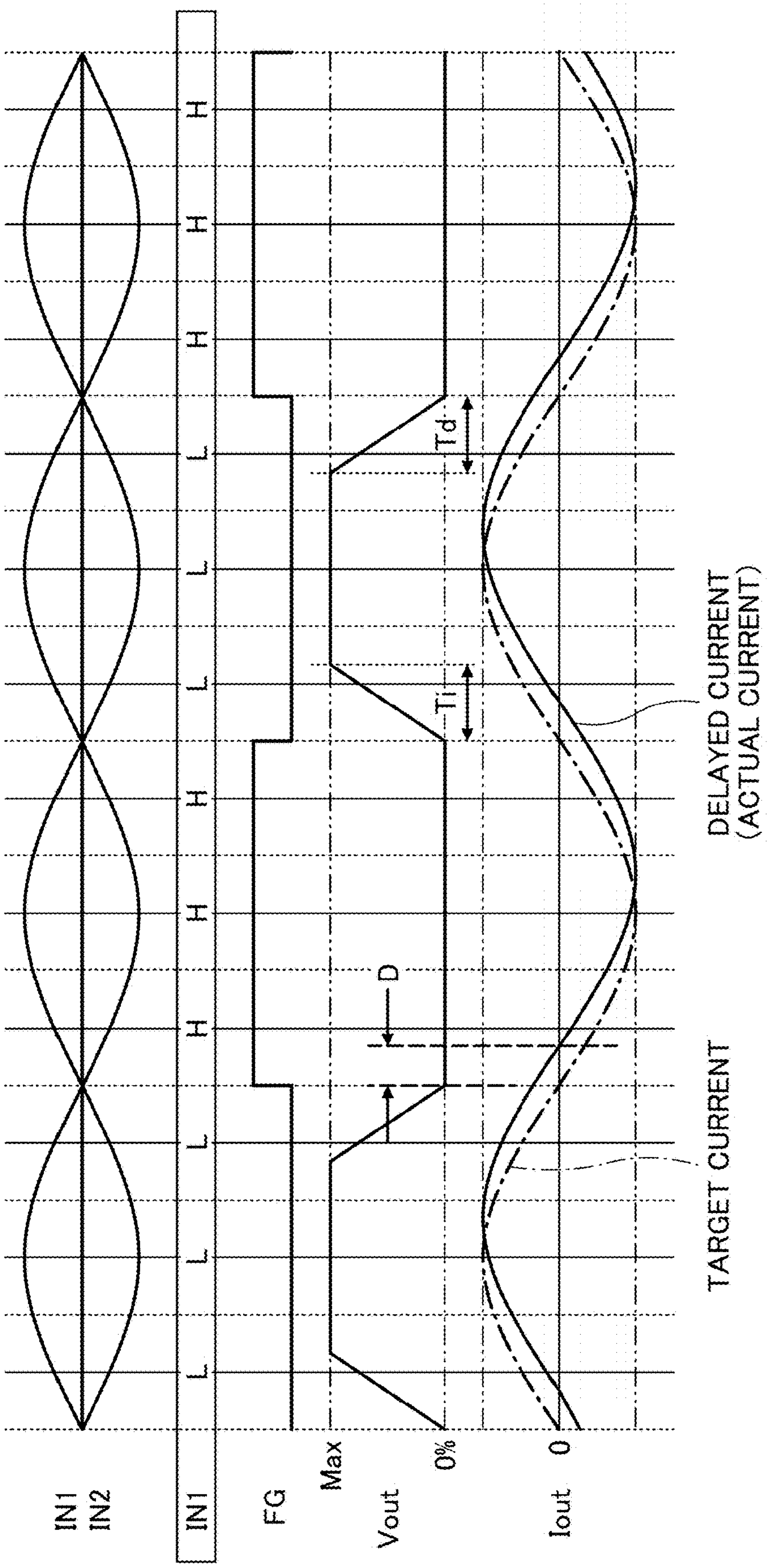
FIG. 7 is a diagram describing the entire operation in a comparative example in which a lead angle is not adjusted.

FIG. 7 is a diagram for describing the entire operation in a comparative example in which a lead angle is not adjusted.

In a BLDC motor, in response to turning on or off the drive voltage, the drive current changes with a delay in time, due to characteristics (V=L*dI/dt) of a coil. In an example shown in FIG. 7, a zero point of the drive current Iout is delayed by time D with respect to the zero point of the drive voltage Vout (zero cross point).

Here, in order to increase the rotational speed of the motor, the current is required to increase, and the time delay increases in accordance with an increasing current. In this case, when the motor rotates at a high speed, a phase of the drive current deviates from a phase corresponding to an actual position of the motor that is detected by a Hall element. As a result, a driving force is not sufficiently transferred into torque, and even when the current is increased, the rotational speed does not increase proportionally as expected, and thus the efficiency is decreased.

(Operation Control)

In this arrangement, in the present disclosure, a timing at which the drive voltage varies is adjusted based on a timing of a detected zero point of the actual current. Thus, the phase change point of the position-detecting signal, FG or FG_offset, and the zero cross point of the drive current are controlled to match with each other.

Figure 8:
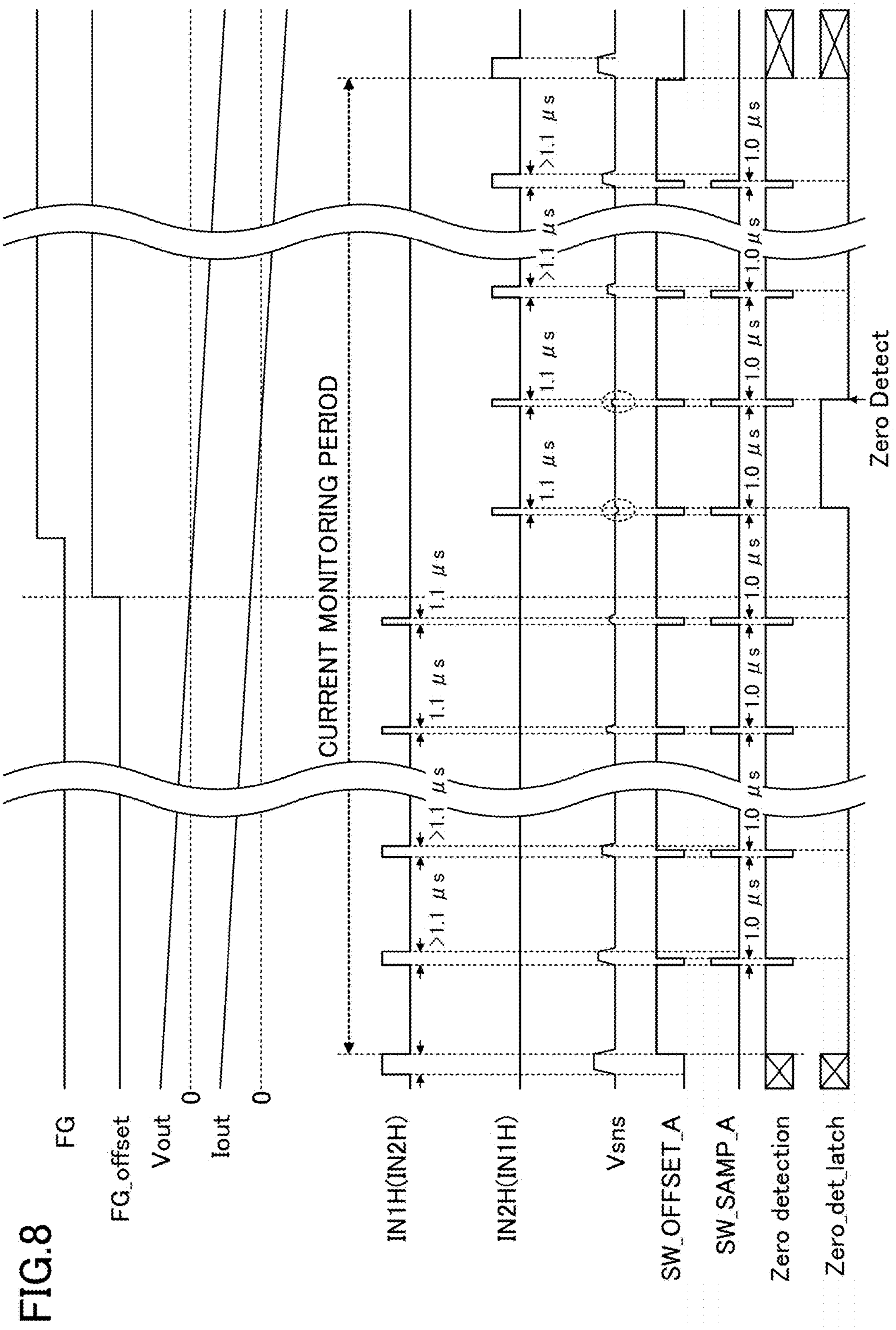
FIG. 8 is a diagram describing a signal operation by a motor drive controller during steady rotation.
Figure 9:
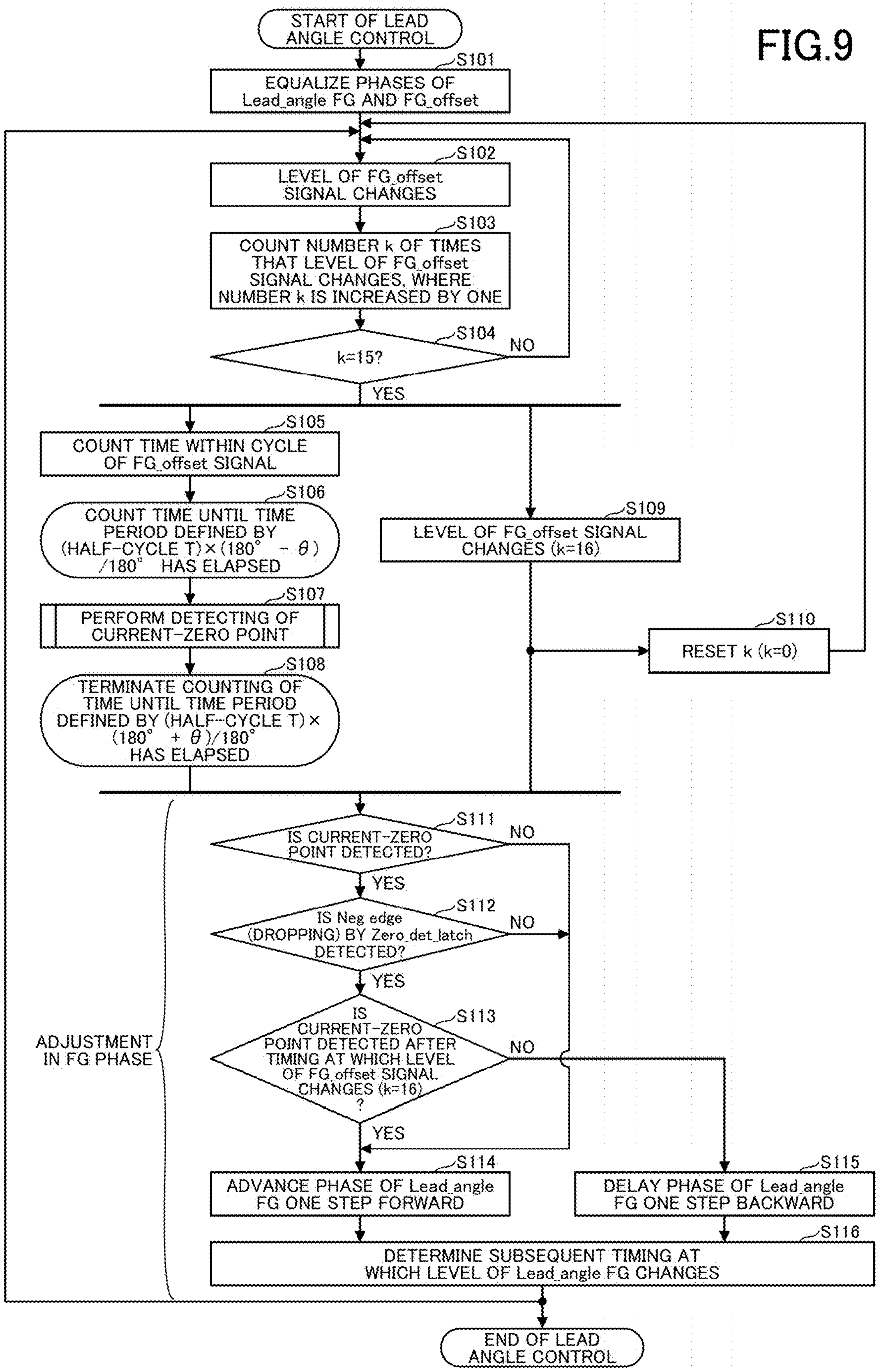
FIG. 9 is a schematic flowchart showing the control during steady rotation according to one embodiment.
Figure 10:
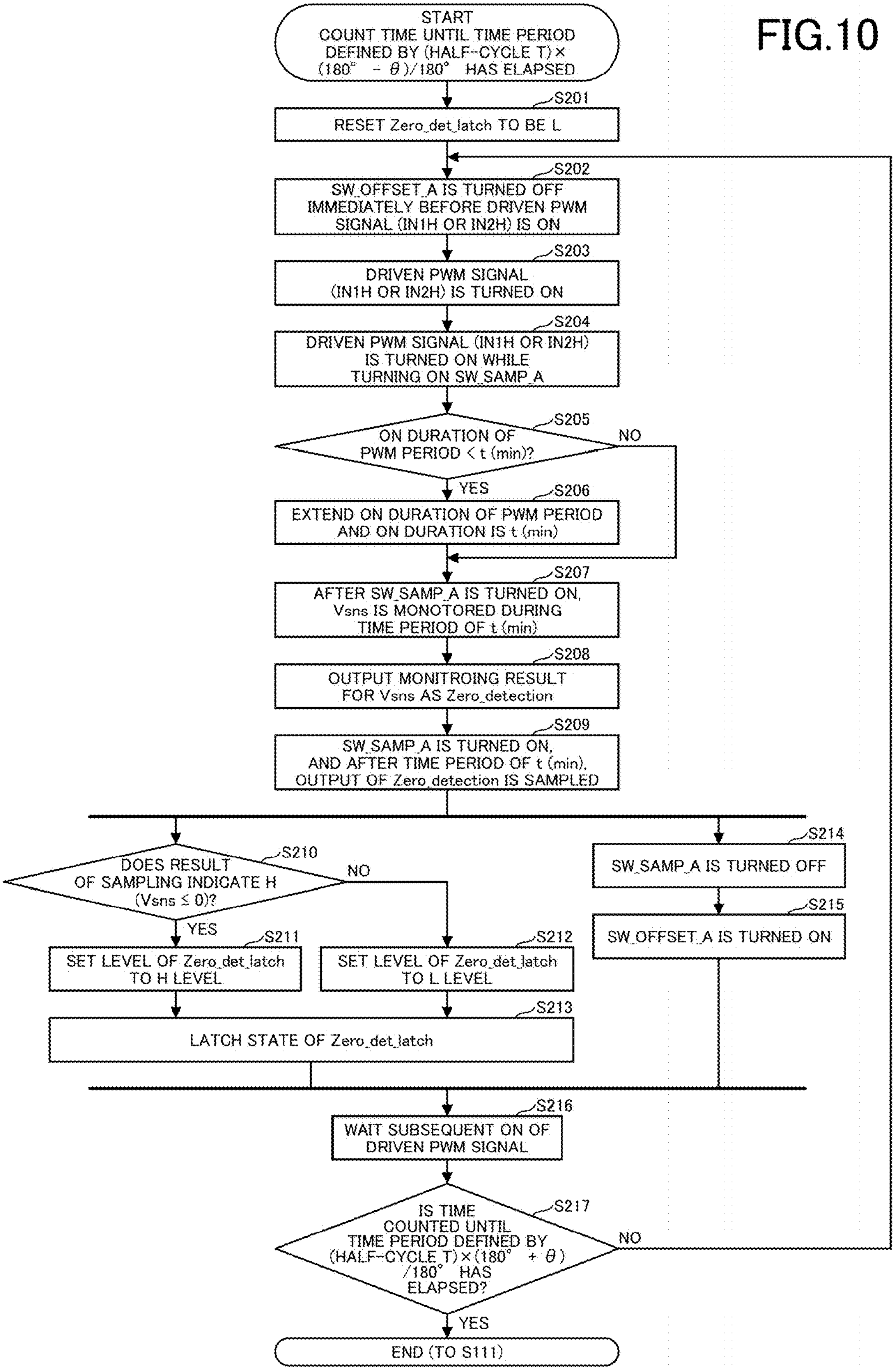
FIG. 10 is a detailed flowchart showing an example of detecting a current-zero point during steady rotation according to one embodiment.

Hereinafter, a case where an angle lead control is performed every 16 times the phase changes as an example of the control in the present disclosure will be described with reference to an operation shown in FIG. 8 and flowcharts shown in FIGS. 9 and 10. FIG. 8 is a diagram showing an example of a signal operation in the motor drive controller during steady rotation. FIG. 9 is a schematic flowchart showing the control during steady rotation according to the embodiment. FIG. 10 is a detailed flowchart showing current-zero point detection during steady rotation according to the embodiment. As described above, in the present disclosure, the current-zero point of the actual drive current is detected and controlled to match the position detecting signal that is used for the rotor.

FIG. 8, FIG. 9, and FIG. 10 show behaviors during steady-state rotation (high-speed rotation). The position detecting signal for the rotor to indicate a target position during high-speed rotation is an FG_offset signal.

FIG. 8 shows an example in which one step (predetermined degrees) in the lead angle control corresponds to one cycle of the PWM signal and is expressed by 1/1024 (≈0.35 degrees) that corresponds to one cycle of the FG signal.

When the lead angle adjustment shown in FIG. 9 is performed, the LAFG signal generator 43 first sets the LAFG signal, Lead_angle FG, in phase with the FG_offset signal in S101.

When the phase of the FG_offset signal changes in S102, the phase change counter 41 adds one to the number k of times the phase of the FG_offset signal changes (S103).

Until the number k reaches 15 (No in S104), the current-zero point detection and the lead angle adjustment are not performed. After repeating S102 and S103, when the number k reaches 15 (Yes in S104), the process proceeds to a subsequent step, and the time counter 42 measures the time within the half-cycle T of the FG_offset signal (S105).

When the time counter 42 measures the time until a time period that is defined by (the half-cycle T)×(180°−θ)/180°) elapses (S106), the current is monitored and the current-zero point detection is performed (S107). Details of the current-zero point detection will be described below with reference to FIG. 10. FIG. 8 shows an example in which an angle that is first set under a condition in which the current-zero point is detected is −45° to which the phase of the FG_offset signal changes.

Then, when the time counter 42 measures the time until the time period defined by (the half-cycle T)×(180°+θ)/180°) elapses, it is determined that the current monitoring period has elapsed, and the monitoring of the current-zero point is terminated (S108). In the process shown in FIG. 8, an angle that is finally set under a condition in which the current-zero point is detected (current monitoring period elapses) is +44.65° to which the phase of the FG_offset signal changes.

Here, simultaneously with a step in which the current-zero point is detected, the drive voltage falls with a gradient according to the change in the phase of the FG_offset signal, and the phase of the drive current also changes accordingly (S109). When the number k of times the phase of the FG_offset signal changes becomes 16, the number k of times the phase of the FG_offset signal changes is reset to zero (S110).

Thereafter, the process proceeds to S111 to S117 in which FG phase adjustment (lead angle adjustment) is performed.

First, in S106 to S108, the LAFG signal generator 43 first determines whether the current-zero point is detected as shown in FIG. 8, that is, whether the output state notification signal, Zero_det_latch, become H (a detection state) within the current monitoring period (S111).

If the current-zero point is not detected (No in S111), the phase of the LAFG signal is advanced one step forward (S114) because the phase of the drive current is substantially delayed with respect to the current monitoring period. Note that one step used when the phase of the LAFG signal is advanced or delayed during a subsequent period corresponds to one cycle of the PWM signal, and is substantially shorter than the current monitoring period for the FG_offset signal. The one step is defined, for example, by 0.35 degrees.

If the current-zero point is detected (Yes in S111), it is determined whether a fall (exiting of a detection state) of the state notification signal, Zero_det_latch, is detected.

If the fall of the state notification signal, Zero_det_latch, is not detected (No in S112), it means that an end point of the current monitoring period is within a time period in which the state notification signal, Zero_det_latch, indicates H. Thus, the phase of the LAFG signal is advanced one step forward (S114) because the phase of the drive current is significantly delayed with respect to the current monitoring period.

If the fall of the state notification signal, Zero_det_latch, is detected (Yes in S112), a timing at which the state notification signal falls is compared with a timing at which the phase of the FG_offset signal changes in a case where k=16 is satisfied (S113).

When the timing at which the state notification signal, Zero_det_latch, falls is later than the timing at which the phase of the FG_offset signal changes (Yes in S113), the phase of the LAFG signal is advanced one step forward (S114).

If the timing at which the state notification signal, Zero_det_latch, falls is earlier than the timing at which the phase of the FG_offset signal changes (No in S113), the phase of the LAFG signal is delayed one step backward (S115).

A timing at which the phase of the LAFG signal changes in a subsequent cycle of the FG_offset signal is determined by performing steps S111 to S115, and a timing at which the voltage varies is adjusted by controlling the drive voltage that is generated by the controller 15 and the gate driver 16, in accordance with the timing at which the phase of the LAFG signal changes (S116).

Hereinafter, the detecting of the current-zero point during the current monitoring period will be described in detail with reference to FIG. 10.

When the time counter 42 measures the time until a time period defined by (the half-cycle T)×(180°−θ)/180°) (S107 in FIG. 9) elapses, the current is monitored, and the detecting of the current-zero point is performed.

First, the state notification signal, Zero_det_latch, is reset to L (S201).

Immediately before the drive PWM signal is turned on, the standby signal, SW_OFFSET_A, is turned off (S202). Then, when the drive PWM signal (1N1H for driving M1) is turned on at a timing at which the PWM period (S203) elapses, the sampling signal, SW_SAMP_A, is turned on at the same timing as described at the timing of the PWM period elapsing (S204).

In soft-switching, an on duration is controlled to be gradually shorten within the PWM period as the on duration approaches zero. However, during the current monitoring period, when an on duration of the driven PWM signal is t (1.0 μs) or less (Yes in S205), the on duration is set to be t (1.0 μs) or longer (S206). FIG. 8 shows an example in which a minimum value of the on duration of the PWM period is set to be 1.1 μs and t=1.0 μs is satisfied.

When on durations of the driven PWM signal are all longer than t (1.0 μs) (No in S205), no adjustment is required and the process proceeds to a subsequent step.

Thereafter, when the sampling signal, SW_SAMP_A, is turned on, the detection voltage Vsns is monitored for a predetermined period t (1.0 μs) (S207).

A monitoring result for the detection voltage Vsns is output to the latching unit 33 as the zero point output, Zero_detection (S208).

The sampling signal, SW_SAMP_A, is turned on, and after the predetermined time period t (1.0 μs), the latching unit 33 samples the zero point output, Zero detection (S209).

As a result of the sampling, if the zero point output, Zero detection, that is input to the latching unit 33 indicates H within the on duration of the sampling signal, SW_SAMP_A (Yes in S210), that is, if the detection voltage Vsns is negative at a timing at which sampling is performed by the sampling signal, SW_SAMP_A, the output voltage Vout is defined by Vout<0 and the output current Iout is defined by Iout≥0. As a result, the state notification signal, Zero_det_latch, is set to be H (detection state) (S211).

On the other hand, if the zero point output, Zero detection, that is input to the latching unit 33 indicates L during the on duration of the sampling signal, SW_SAMP_A (Yes in S210), that is, if a time period in which the detection voltage Vsns is negative at a timing at which sampling is performed by SW_SAMP_A is not detected, the state notification signal, Zero_det_latch becomes L. At this time, if the state notification signal, Zero_det_latch, is not raised, a L state is maintained. On the other hand, if the state notification signal, Zero_det_latch, is raised in a preceding PWM period, a condition "the output voltage Vout<0 and the output current Iout<0" is satisfied, and the state notification signal, Zero_det_latch, falls by determining that a current level is below the zero point. As a result, the detection state exits (S212).

A state of the state notification signal, Zero_det_latch, is maintained (S213).

On the other hand, simultaneously with turning on or off the state notification signal in S210 to S213, when an off duration of the PWM period appears in S214, the sampling signal, SW_SAMP_A, is turned off, and the standby signal, SW_OFFSET_A, is turned on (S215).

Then, a subsequent on duration of driven PWM signal waits (S216). If it is within the current monitoring period (No in S217), the process returns to the process before S202 and repeats the detection operation for the current-zero point, for every PWM period.

On the other hand, if the time counter 42 measures the time until the time period defined by (half-cycle T)×(180°+θ)/180°) elapses (Yes in S217), the monitoring of the current is terminated and the current monitoring period expires (END).

In FIG. 8, FIG. 9, and FIG. 10, the behavior in the steady-state rotation in which the rotating is performed stably is described, but the phase control (lead angle control) for the drive current can be performed even in a case other than the rotation-stable state.

In the example of FIG. 8, the phase of the FG_offset signal is advanced with respect to the phase of the FG signal. Phase shift of the drive current with respect to the BEMF of the rotor that is detected by the position detecting signal from the Hall element 6 is increased during high-speed rotation than during start-up. In view of the above situation, it is preferable to perform switching such that the original FG signal is used as a reference signal during soft-starting that is performed when the power is started, and such that the FG_offset signal is used as a reference signal during high-speed rotation.

In detail, at startup or restart due to a motor lock, a PWM input that is a speed control input varies, and thus the speed changes. As a result, the phase change (lead angle control) in the output is performed according to the FG signal. In this case, it is preferable that during a time period in which a rotational variation made until the rotating is performed stably, phase adjustment is performed frequently compared to a case where the rotating is performed stably. For example, phase adjustment is performed every two cycles of the FG signal.

Note that at startup and restart, in detecting the current-zero point within the current monitoring period, the sampling signal, SW_SAMP_A, is turned on during a time period in which the driven PWM signal (IN2H for driving M2) is turned on under the control in FIG. 10. This differs from a case during steady rotation.

(Current after Performing Lead Angle Adjustment)

Figure 11:
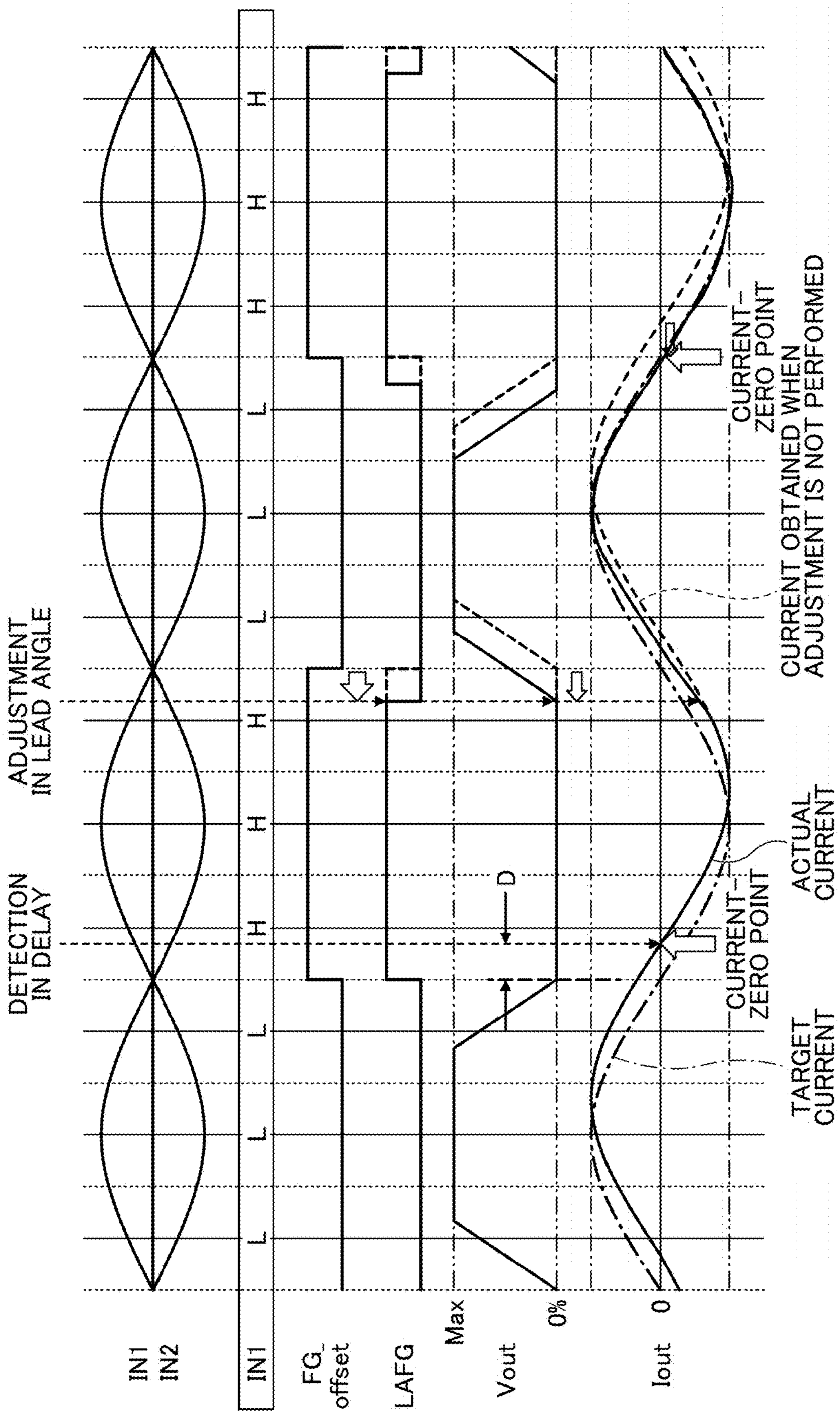
FIG. 11 is a diagram for describing the overall operation in which the lead angle is adjusted according to one embodiment.

FIG. 11 is a diagram for describing the overall operation performed when the lead angle adjustment in the present disclosure is performed.

In FIG. 11, as described above, the lead angle adjustment in the LAFG signal in a subsequent cycle is performed based on a result of detection in the current-zero cross point, when changing the phase of the FG_offset signal immediately before the drive voltage varies. With this approach, a slightly earlier timing at which the drive voltage varies is obtained. As a result, the zero cross point of the current Iout, which is slightly delayed from a changed output voltage Vout, exactly matches a change in the phase (dropping) of the FG_offset signal.

With this arrangement, when the motor rotates at a high speed, the phase of the drive current matches the phase of the Hall signal indicating the actual position of the motor. As a result, a driving force is sufficiently transmitted into torque, and when the current is increased, the rotational speed increases proportionally as expected, thereby improving efficiency. Accordingly, the motor control circuit in the present disclosure improves the efficiency when the single-phase motor rotates at a high speed. In this arrangement, the motor is enabled to rotate at a sufficiently high speed in accordance with a predetermined current magnitude. Also, the motor is enabled to rotate with a smaller current even at the same rotational speed.

Modification 1

In the above example, an example of detecting a phase inversion point at which the signal changes from H to L is described, where a phase inversion point is used as a detection timing at which the phase of the position detecting signal (FG or FG_offset) changes. However, in phase change detection, the phase inversion point at which the signal changes from L to H may be detected. In this case, a timing at which the current changes from a negative level to a positive level is monitored and detected in the current-zero point detection, where the timing corresponds to a timing at which the position detecting signal changes from L to H.

Modification 2

In FIG. 1, a configuration of the H-bridge circuit is described using FETs as switches, but the switches of the H-bridge may be used as bipolar transistors.

Modification 3

Furthermore, the motor control circuit in the present disclosure is applicable not only to a 1-channel H-bridge but also to a BLDC motor of a 1.5 channel H-bridge (3 half-bridges).

Although the preferred embodiments and the like are described in detail above, they are not limited to the above-described embodiments and the like, and various variations and substitutions can be made to the above-described embodiments and the like without departing from the scope described in the present disclosure.

In one aspect, a motor control circuit can improve efficiency of a motor that rotates at a high speed, rotate the motor at a sufficiently high speed by a predetermined current magnitude, and rotate the motor at a lower current even at the same number of revolutions.

What is claimed is:

1. A motor control circuit for supplying a drive voltage to a brushless direct current (DC) motor via a motor drive unit, the motor control circuit comprising:

a current-zero point detector configured to detect a voltage corresponding to a drive current that flows through a coil of the brushless DC motor, and detect a timing at which the drive current becomes zero;

a position-detecting signal generator configured to output a reference position detecting signal based on a Hall signal that is generated by a Hall element;

a phase adjuster configured to adjust a phase of a targeted position detecting signal that is present after a subsequent cycle of the reference position detecting signal based on (i) the timing at which the drive current detected by the current-zero point detector becomes zero and (ii) the reference position detecting signal; and a drive controller configured to control a timing at which the drive voltage varies such that the timing of the drive voltage varying matches a timing at which the phase of the targeted position detecting signal changes, and to output the drive voltage, wherein the current-zero point detector is configured to be electrically coupled to the motor drive unit, and is configured to be electrically coupled to a first terminal of a resistor, a second terminal of the resistor being grounded, wherein the current-zero point detector is configured to detect a timing at which a level of a detected voltage corresponding to the drive current changes from either zero or a negative level to a positive level, to detect a zero point of the drive current, wherein the current-zero point detector is configured to receive two signals, wherein the current-zero point detector includes a voltage comparison circuit;

a switch coupled to an input terminal of the voltage comparison circuit, and being configured to set an input voltage of the voltage comparison circuit to a voltage corresponding to the detected voltage or a ground voltage, based on an on-off status of each of the two signals; and a latching unit configured to output a state notification signal indicating a state of the drive current, based on a comparison result by the voltage comparison circuit, wherein the voltage comparison circuit includes a capacitor to which the input voltage is applied;

an inverter coupled to a subsequent stage of the capacitor; and a switch configured to short-circuit the inverter according to a state of each of the two types of signals, during a time period in which the ground voltage is applied to the voltage comparison circuit, and wherein the voltage comparison circuit is configured to compare the ground voltage with the detected voltage, and output a comparison result.

2. The motor control circuit according to claim 1, wherein the current-zero point detector is configured to monitor the drive current during a current monitoring period that is an angle period in which a phase of the drive current changes before and after a timing at which a phase of the reference position detecting signal changes.

3. The motor control circuit according to claim 2, wherein the motor drive unit includes an H-bridge circuit including a first upper switch, a second upper switch, a first lower switch, and a second lower switch, wherein the motor control circuit further includes a pulse width modulation (PWM) signal generator configured to generate a PWM signal to switch between a first state and a second state of the H-bridge circuit, the first upper switch and the second upper switch being configured to be turned on in the first state, and the first lower switch and the second lower switch being configured to be turned on in the second state, and output the PWM signal to the drive controller, wherein the current-zero point detector is configured to generate the state notification signal indicating the state of the drive current during the current monitoring period, and wherein the state notification signal is configured to be detected at the timing at which the drive current becomes zero, and a detection state of the state notification signal is configured to exit upon occurrence of a condition in which one PWM period has elapsed after the drive current becomes zero.

4. The motor control circuit of claim 3, wherein during the current monitoring period, the phase adjuster is configured to advance the phase of the targeted position detecting signal by a predetermined amount, upon occurrence of a condition in which a timing at which the detection state of the state notification signal exits is later than the timing at which the phase of the reference position detecting signal changes, in conjunction with a condition in which information indicating the detection state or the exiting of the detection state is not output.

5. The motor control circuit of claim 3, wherein during the current monitoring period, the phase adjuster is configured to delay the phase of the targeted position detecting signal by a predetermined amount upon occurrence of a condition in which a timing at which the detection state of the state notification signal exits is earlier than the timing at which the phase of the reference position detecting signal changes.

6. The motor control circuit of claim 3, wherein the phase adjuster is configured to cause the current-zero point detector to monitor the drive current for each predetermined number of times the phase of the reference position detecting signal changes, and adjust the phase of the targeted position detecting signal.

7. The motor control circuit of claim 3, wherein in a case where the drive voltage varies, the drive controller includes a soft-switching controller configured to perform soft-switching that allows for a gradient of the drive voltage to be created by gradually adjusting an on duration of the PWM period.

8. The motor control circuit of claim 2, wherein at startup of the motor, the position-detecting signal generator is configured to output, as a reference, the position detecting signal that matches a Hall signal that is generated by the Hall element, and wherein during steady rotation, the position-detecting signal generator is configured to output, as a reference, the position detecting signal whose phase is advanced or delayed by a predetermined amount with respect to the Hall signal.

9. The motor control circuit according to claim 1, wherein the current-zero point detector includes an adjustment circuit configured to be enabled via a switch that is turned on in a case where an adjustment signal is on, the adjustment signal being different from the two signals, wherein the adjustment circuit includes a constant voltage source configured to generate a constant voltage;

an offset capacitor coupled in parallel with the capacitor and coupled to a front stage of the inverter of the voltage comparison circuit; and a switch configured to change a voltage to be applied to one end of the offset capacitor, to the ground voltage or the constant voltage, based on the state of each of the signals, and wherein the voltage comparison circuit is configured to compare a value offset from the ground voltage with the detected voltage, and output a comparison result.

10. A motor control integrated circuit comprising:

the motor control circuit of claim 1, wherein the motor control circuit is a semiconductor integrated circuit configured to control the motor drive unit.

11. A method for controllably driving a motor for supplying a drive voltage to a brushless direct current (DC) motor via a motor drive unit, the method comprising:

monitoring a voltage corresponding to a drive current that flows through a coil of the brushless DC motor, and detecting a timing at which the drive current becomes zero;

outputting a reference position detecting signal based on a Hall signal that is generated by a Hall element;

adjusting a phase of a targeted position detecting signal that is present after a subsequent cycle of the reference position detecting signal based on (i) the timing at which the drive current detected by a current-zero point detector becomes zero and (ii) the reference position detecting signal; and controlling a timing at which the drive voltage varies such that the timing of the drive voltage varying matches a timing at which the phase of the targeted position detecting signal changes, and outputting the drive voltage, wherein the method further includes:

detecting, by the current-zero point detector that is electrically coupled to the motor drive unit and is electrically coupled to a first terminal of a resistor, a timing at which a level of a detected voltage corresponding to the drive current changes from either zero or a negative level to a positive level, to detect a zero point of the drive current, wherein a second terminal of the resistor is grounded;

receiving two signals by the current-zero point detector that includes a voltage comparison circuit, and a switch coupled to an input terminal of the voltage comparison circuit;

setting, by the switch, an input voltage of the voltage comparison circuit to a voltage corresponding to the detected voltage or a ground voltage, based on an on-off status of each of the two signals; and outputting, by a latching unit of the current-zero point detector, a state notification signal indicating a state of the drive current, based on a comparison result by the voltage comparison circuit, the voltage comparison circuit including a capacitor to which the input voltage is applied, an inverter coupled to a subsequent stage of the capacitor, and a switch configured to short-circuit the inverter according to a state of each of the two types of signals, during a time period in which the ground voltage is applied to the voltage comparison circuit, and comparing, by the voltage comparison circuit, the ground voltage with the detected voltage, and outputting, by the voltage comparison circuit, a comparison result.

* * * * *